United States Patent [19]

Wanat

[11] 3,941,288

[45] Mar. 2, 1976

[54] APPARATUS FOR POSITIONING A WEB

[75] Inventor: Robert R. Wanat, Park Ridge, Ill.

[73] Assignee: Teletype Corporation, Skokie, Ill.

[22] Filed: Dec. 18, 1974

[21] Appl. No.: 534,025

[52] U.S. Cl. .................................... 226/74; 226/179
[51] Int. Cl.$^2$ ............................................ G03B 1/30
[58] Field of Search ........... 226/6, 74, 75, 199, 179

[56] References Cited

UNITED STATES PATENTS

| | | | |
|---|---|---|---|
| 2,140,028 | 12/1938 | Nichols | 226/74 |
| 2,979,829 | 4/1961 | Uhleen | 226/199 |
| 3,006,520 | 10/1961 | House | 226/75 |
| 3,114,491 | 12/1963 | Wright | 226/75 |

*Primary Examiner*—Allen N. Knowles
*Assistant Examiner*—H. Grant Skaggs
*Attorney, Agent, or Firm*—W. K. Serp; J. L. Landis

[57] ABSTRACT

An apparatus is described for positioning a paper web with respect to the print mechanism of a high speed printer. The apparatus includes a rod supported by the main frame of the printer and a slide tube is coaxially positionable on the rod. A pair of tractors for driving the web across the print station are carried upon the slide tube. One of the tractors is fixed to one end of the slide tube and the second tractor is positionally adjustable upon the slide tube. A clamp is provided for securing the second tractor to the slide tube after the spacing between the tractors is adjusted in relation to the width of the paper web. The slide tube is positioned to locate the type margin on the web at the desired location and a second clamp secures the slide tube to the rod.

10 Claims, 5 Drawing Figures

APPARATUS FOR POSITIONING A WEB

BACKGROUND OF THE INVENTION

This invention generally relates to an apparatus for positioning a web of paper stationery with respect to the print mechanism of a high speed printer and more particularly relates to such an apparatus which includes means for accommodating various web widths and for positioning the web so as to accurately locate the printed type margin thereon.

The rapid growth of data communications systems, over the last few years, has greatly increased the demand for high speed alphanumeric printers which print the informational data in readable form upon a paper web. Such printers are frequently operated on a continuous basis and require operator attendance only for replacement of an exhausted paper supply or clearance of a paper jam. The paper stationery used in such printers is generally supplied as a continuous sheet with transverse perforations facilitating the removal of selected pages. Additionally, extending longitudinally adjacent the margins of the paper are a series of spaced sprocket holes which are engaged by a drive mechanism provided on the printer which drives the paper past the print mechanism.

A wide variety of stationery sizes are available having various widths to accomodate different user requirements. Thus, for greatest versatility, it is desirable that the printer include means for adapting to a wide range of paper widths. Frequently, during daily operation, the operator is required to change the paper in a printer to one having a different width to correspond with a new data format. Additionally, the location of the print margin on the paper may require a corresponding adjustment. Often, one operator is assigned the task of servicing several machines and thus it is extremely important that the printers under his supervision be adapted to facilitate rapid and convenient replacement of the paper therein and adjustment to varying paper size and data format. One such device adapted for positioning the paper in a teleprinter is described in U.S. Pat. No. 3,799,313 entitled "Adjustable Sprocket Assembly" issued to B. L. Shevick on Mar. 26, 1974, having a common assignee with this application. As described in this reference, the sprocket drives are independently positioned to accommodate the paper width. Margin adjustment of the type upon the paper necessitates repositioning both of the sprocket drives and is a somewhat cumbersome procedure. J. M. Ostray in U.S. Pat. No. 1,938,531, entitled "Adjustable Guide for Paper Plates of Typewriters" describes a device which includes two slides for engaging the margins of the paper. The paper is positioned at the desired location and each slide positioned until the paper nests between them. Once positioned, it is relatively difficult to reposition the paper to varying the location of the print margin thereon since; to accomplish this end, both of the slides must be repositioned. U.S. Pat. No. 2,273,565 issued to J. E. Euth et al. on Feb. 17, 1947 and entitled "Stationery-Guide Assembly" is addressed to this problem and provides two paper margin guides supported upon a support screw. The guides are positioned on the support screw to the desired paper width and the support screw turned to simultaneously position both guides until the type margin is at the desired location on the paper. The apparatus described by Euth et al. is relatively complicated and requires considerable operator time to effect adjustment.

The illustrated embodiment provides a web guide mechanism which is relatively simple in construction and may be quickly and accurately adjusted to accommodate various web widths and selected margin requirements. The apparatus described includes means for conveniently shifting the paper location with respect to the print mechanism so that the type margin on the paper may be accurately located without disturbing the web width setting. All adjustments may be accomplished quickly and the apparatus being relatively simple requires little or no maintenance.

SUMMARY OF THE INVENTION

An apparatus is described for positioning a web defining two continuous edges with respect to the print mechanism of a printer. A main support frame carries an elongated support member upon which is positioned a slide for movement therealong. First web engaging means are carried upon the slide for selective movement therealong. Additionally, second web engaging means are provided for engaging the web at a second fixed location adjacent an alternate margin of the web. The second web engaging means is also mounted upon the slide. Movement of the slide provides selective orientation of the web with respect to the print station whereas movement of the second web engaging means provides selective adaptation of the apparatus to varying web widths.

More particularly, the support member is in the form of a rod mounted upon the support frame and the slide means is in the form of a tube coaxially positioned over the rod. The second web engaging means is mounted in a fixed position on the tube and first means are provided for releasably securing the first web engaging means to the tube to facilitate relative spacing between the first and second web engaging means.

It is a main object of this invention to provide a web positioning apparatus which facilitates the adjustment and placement of the web with respect to the print mechanism of a printer.

Other objects, advantages and features of the invention will be more readily appreciated after reference to the following description and accompanying drawings.

DESCRIPTION OF THE ILLUSTRATED EMBODIMENT

General

Figure 1:
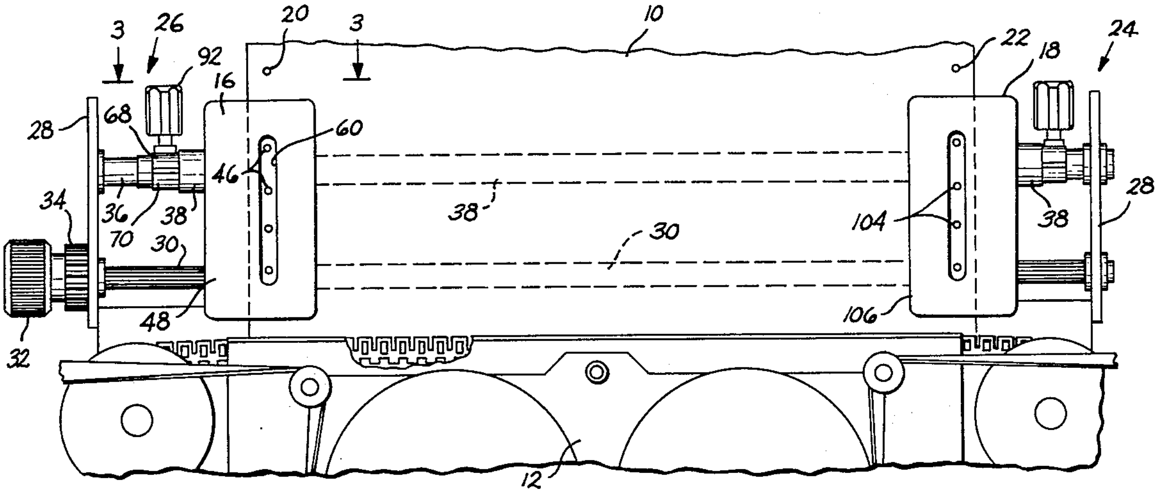
FIG. 1 is a front view of a portion of a high speed printer including certain features of this invention.

With reference to FIG. 1, an apparatus is illustrated for guiding and positioning a paper web 10 with respect to a print mechanism 12 of a high speed impact printer 14. A suitable print mechanism is described in U.S. Pat. No. 3,822,641 entitled "Impactor Assembly for Printers" by Egon S. Babler issued July 9, 1974 and having a common assignee with this application. The apparatus of FIG. 1 further includes a pair of drive tractors 16 and 18 which serve respectively to drivingly engage sprocket holes 20 and 22 located along the longitudinal edges of the web 10 and serves to draw the web 10 across the print mechanism 12. Similar drive tractors are further described in U.S. Pat. No. 3,825,162 entitled "Feed Mechanism" issued to Leo J. Hubbard on July 23, 1974. Additionally, the illustrated apparatus includes web width adjustment means in the form of a clamp 24 for varying the relative spacing of the tractors 16 and 18 to permit adaptation to various web 10 widths. Type margin adjustment means in the form of a clamp 26 are also included for positioning both tractors 16 and 18 in unison and thus the paper web 10 carried by the tractors 16 and 18 with respect to the print mechanism 12 so as to permit convenient adjustment of the type margin upon the web 10.

More particularly, the printer 14 includes a main frame 28 which supports an elongated splined drive shaft 30, the axis of which is parallel to the plane of the web 10. The shaft 30 drivingly passes through the tractors 16 and 18 and is manually driven by a knurled web advance knob 32 secured to one end thereof adjacent the main support frame 28. Additionally, the splined drive shaft 30 is automatically driven by a suitable motor (not shown) through gearing means 34. The drive tractors 16 and 18 slidably ride upon the drive shaft 30 and are also positioned with respect to the print mechanism 12 by means of a support rod 36, the axis of which is parallel to the axis of the drive shaft 30 and which similarly passes through the tractors 16 and 18. The ends of the support rod 36 are secured to the main support frame 28 so that the axis of the rod 36 is substantially parallel to the plane of the paper web 10. The rod 36 in conjunction with the splined drive shaft 30, provides a railed path upon which the tractors 16 and 18 ride. Coaxially placed over the support rod 36 is a slide tube 38 to which each of the tractors are detachably affixed by the clamps 24 and 26 as will hereafter be more thoroughly described.

Figure 2:
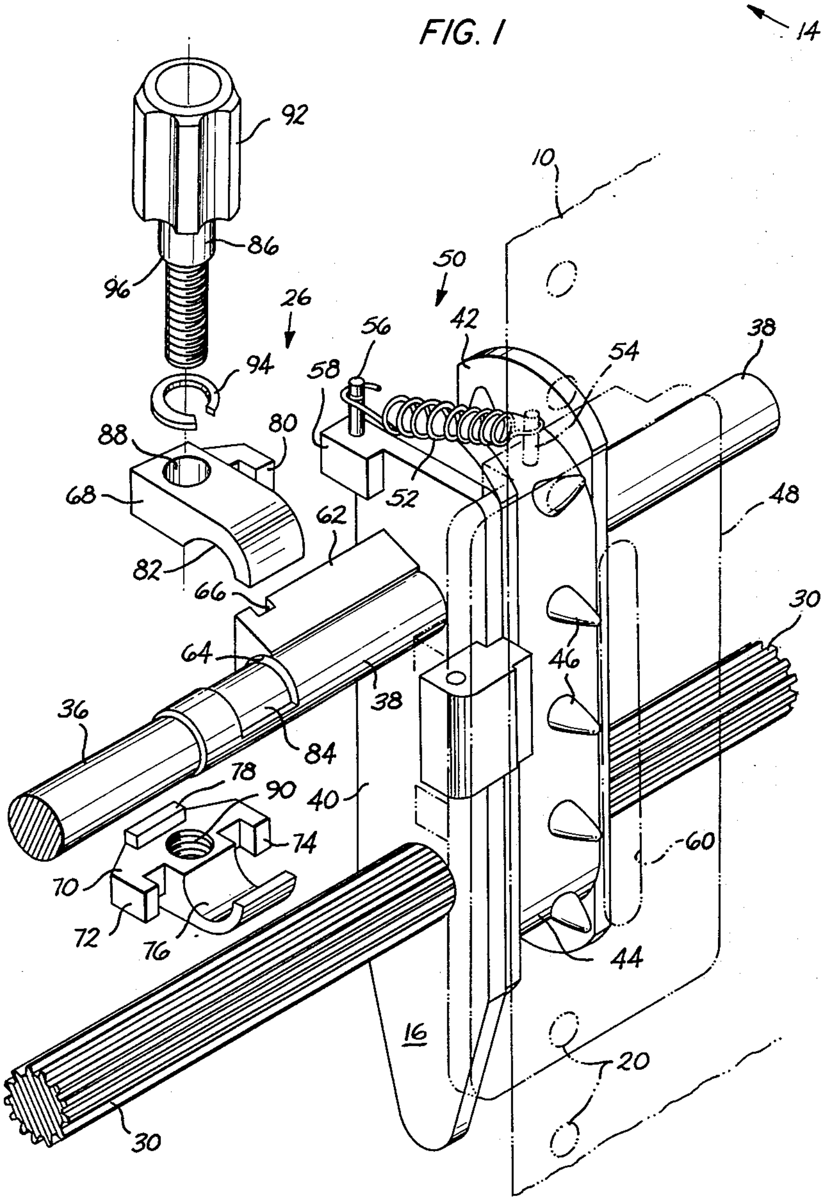
FIG. 2 is an enlarged fragmentary perspective view of a portion of the apparatus of FIG. 1 with certain elements thereof shown by an exploded assembly presentation.
Figure 3:
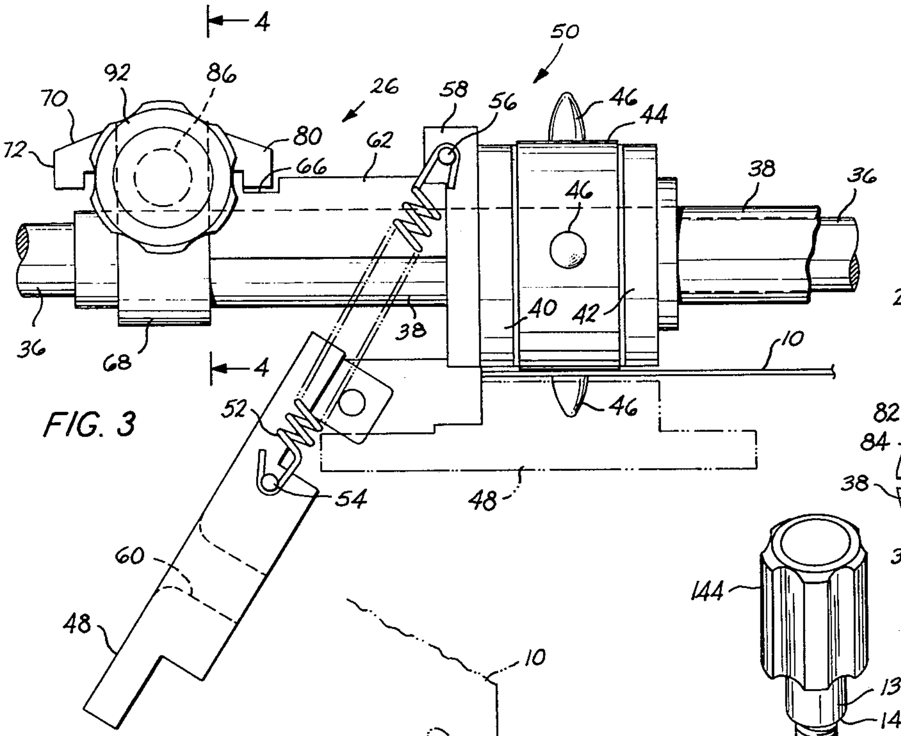
FIG. 3 is an enlarged partial sectional view taken along the line 3—3 of FIG. 1.

With particular reference to FIG. 2, the tractor 16 includes a pair of parallel positioned end plates 40 and 42 through which the drive shaft 30 and support rod 36 and slide tube 38 pass. Positioned between the end plates 40 and 42 and aligned thereby is a continuous flexible belt 44 carrying a plurality of equally spaced web pull pins 46. The pins 46 are spaced to engage the holes 20 defined along the margin of the paper web 10. The splined drive shaft 30 drivingly engages the belt 44 so that as the shaft 30 rotates, the paper web 10 engaged by the pull pins 46 is drawn across the print mechanism 12 in a manner well known to those skilled in the art. Serving to hold the web 10 against the belt 44 and thus assure driving engagement by the pull pins 46 is a door 48 hinged to the support plate 40 and movable from a closed position illustrated in FIG. 2 to an open position as illustrated in FIG. 3. Maintaining the door 48 securely in the selected position is an over center toggle mechanism 50 including a coil spring 52 one end of which is secured to a pin 54 affixed to the top of the door 48 and the remaining end of the spring is secured to a pin 56 extending from a tab 58 formed on the tractor side plate 40. Additionally, the door 48 defines an elongated opening 60 through which the pull pins 46 project, thus assuring that the web 10 will remain securely engaged by the pins 46. Extending from and formed integrally with the side plate 40 is a securing means engagment member 62 one surface of the slide tube 38. Serving to receive the type margin clamp 26 is a notch 66 cut into the side of the member 62 opposite the slide tube 38.

Type Margin Adjustment

The type margin clamp 26 includes upper 68 and lower 70 jaws. The lower jaw 70 is formed to define two L-shaped lugs 72 and 74. The lug 74 is slideably positioned within the notch 66 defined by the engagement member 62. The remaining lug 72 is unused, but is included to minimize the number of unique component parts of the apparatus as will be subsequently more fully appreciated. The lower jaw 70 defines a curved surface 76 shaped to securely engage the lower outer wall of the slide tube 38. Additionally, extending upwardly from the rear of the lower jaw 70 is a compression ridge 78. The upper jaw 68 similarly includes a single L-shaped lug 80 slidably positioned within the notch 66 and a downwardly disposed curved surface 82 which is positioned within a cut-out 84 machined into the upper surface of the tube 38 and into engagement with the outer surface of the support rod 36. Serving to permit selective compressive adjustment of the jaws 68 and 70 is a compression screw 86 which freely passes through an oversized hole 88 defined in the upper jaw 68 and into a threaded hole 90 in the lower jaw 70. The screw 86 is provided with a fluted finger adjustment knob 92 and a split ring lock washer 94 is located upon the screw 86 and positioned between the upper surface of the upper jaw 68 and a shoulder 96 defined by the shank of the screw 86. Thus, as the screw 86 is tightened, the jaws of the type margin securing means 24 compress the lower wall of the tube 38 against the rod 36 locking the tractor 16, rod 36 and tube 38 in a preselected fixed position.

Figure 4:
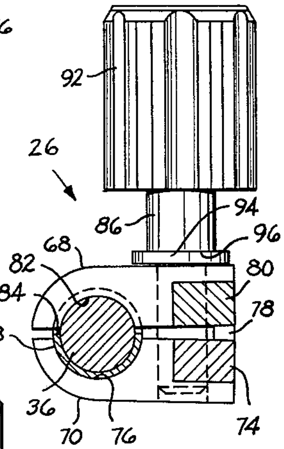
FIG. 4 is a sectional view of a component illustrated in FIG. 3 taken along the line 4—4 with certain operative features exaggerated for clarity of illustration.

With reference to FIG. 4, as the screw 86 is tightened, the curved surfaces 82 and 66 of the upper 68 and lower 70 jaws are brought together and the jaw pivot on the ridge 78 with the jaws closing as far as the dimension of the tube 38 and rod 36 permit. The ridge 78 compensates for any variations in the tube 38 and rod 36 tolerances. To shift the tube 38 and tractor 16 upon the support rod 36, thereby setting the type margin on the web 10, the adjustment screw 86 is loosened slightly, releasing the rod 36, but not so far as to cause the clamp 24 to fall from the cut-out 84 defined by the slide tube 38. Once loosened, the clamp 24, slide tube 38 and tractor 16 can be slidably positioned to an alternate location on the rod 36 and the clamp 24 retightened.

Web Width Adjustment

Figure 5:
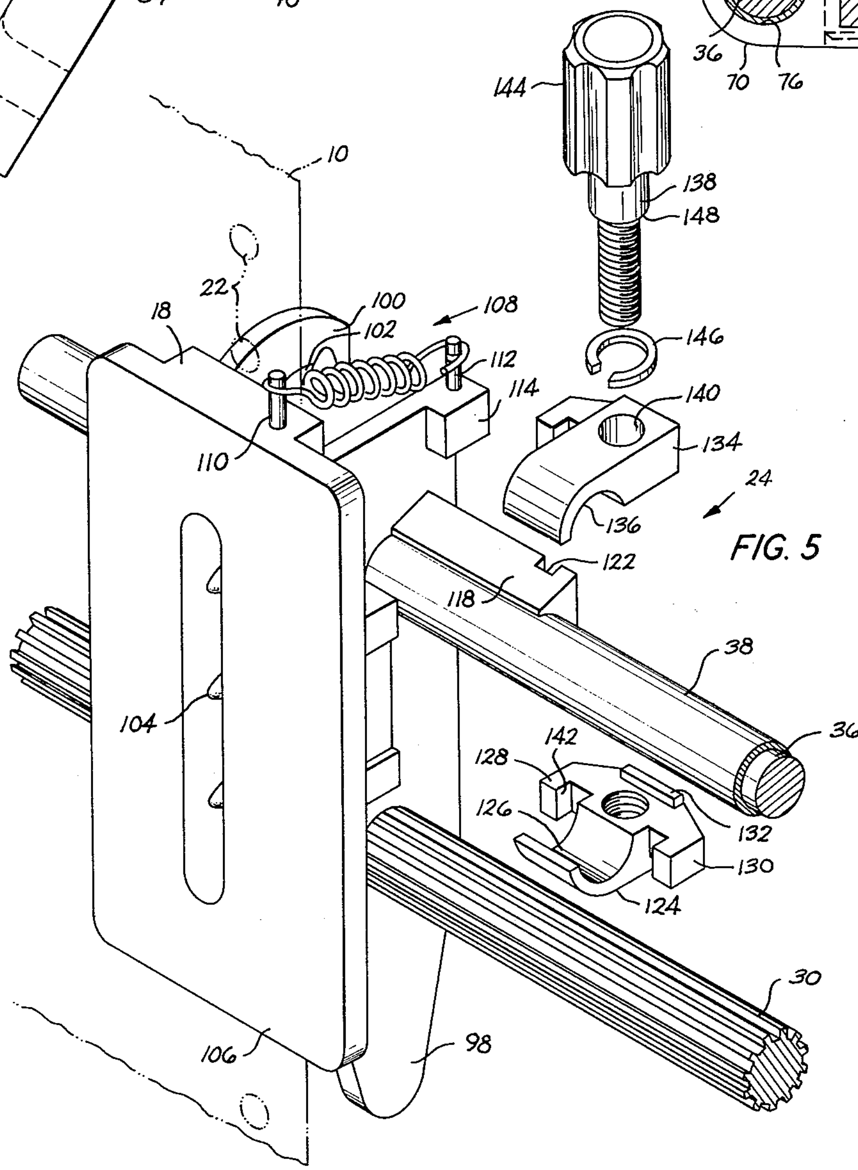
FIG. 5 is an enlarged fragmentary perspective view of a portion of the apparatus illustrated in FIG. 1 with certain elements thereof shown by an exploded assembly presentation.

The tractor 18 illustrated in FIG. 5 similarly includes side plates 98 and 100 and a flexible belt 102 carrying pull pins 104 for engaging the holes 20 defined adjacent the margin of the web 10. Additionally, hinged to the plate 98 is a door 106 having an over center spring loaded toggle mechanism 108 secured thereto. The toggle mechanism 108 includes a pair of pins 110 and 112 respectively secured to the door 106 and a pin support lug 114 projecting from the rearwardly disposed upper end of the side plate 98. A spring 116 is secured to the pins 110 and 112. Formed integrally with the end plate 98 is a web width securing means engagement member 118 defining a curved surface 120 for mating, sliding movement along the slide tube 38. The surface of the member 118 disposed away from the support tube 38 defines a notch 122 for engagement with the clamp 24.

The web width clamp 24 is of similar construction as the margin set clamp 26 previously described and includes a lower jaw 124 defining an upwardly disposed curved surface 126 for mating engagement with the outer surface of the slide tube 38. Additionally, the lower jaw 124 defines a pair of oppositely projecting L-shaped lugs 128 and 130. Lug 128 is slidably inserted into the notch 122 defined by the engagement member 118. Projecting upwardly from the rear end of the lower jaw 124 is a compression ridge 132 providing a pivotal bearing for an upper jaw 134. The upper jaw 134 defines a downwardly disposed curved surface 136 shaped for mating engagement with the upwardly disposed surface of the slide tube 38. Serving to selectively compress the jaws 124 and 134 about the slide tube 38 and thus secure the tractor 18 to the tube 38 is a web width adjustment screw 138 which passes through an over-sized hole 140 in the upper jaw 134 and is screwed into a threaded hole 142 in the lower jaw 124. Fastened to the upper end of the screw 138 is a fluted finger adjustment knob 144 which facilitates hand adjustment of the screw 138 and a split ring lock washer 146 is placed about the screw 138. Upon tightening the screw 138, the lock washer 146 is compressed between a shoulder 148 defined by the screw 138 and an upwardly disposed surface of the upper jaw 134.

Operation

In use, the tractor doors 48 and 106 are opened exposing the pull pins 46 and 104 and the marginal perforations 20 and 22 of the web 10 are engaged with the pull pins 46 and 104. The separation between the tractors 16 and 18 is adjusted to accommodate the width of the web by loosening the web width adjustment screw 138 so as to permit free sliding movement of the tractor 18 along the slide tube 38. The tractor 18 is then positioned along the tube 38 until the spacing between the pull pins 46 and 104 corresponds to the distance between the marginal perforations 20 and 22. Once positioned, the clamp 24 is tightened, securing the spacing between the tractors 16 and 18. The location of the type margin on the web 10 is set by positioning the web 10 with respect to the print mechanism 12. To set the location of the type margin, the margin adjustment screw 86 is loosened releasing the clamp 26 and thereby releasing the frictional lock between the slide tube 38 and the support rod 36. The tube 38 is coaxially moved over the rod 36 until the desired location of the type margin on the web 10 is obtained at which point the margin set screw 86 is tightened, locking the position of the tractors 16 and 18 with respect to the main frame 28 and the print mechanism 12 carried thereon. It should be noted that as the slide tube 38 is moved over the support rod 36, the relative positioning of the tractors 16 and 18 is maintained and thus the web width setting of the tractors remains undisturbed.

An apparatus has been described which readily permits adjustment to various web widths and of the type margin upon the web without disturbing the web width adjustment. Although the invention has been particularly shown and described in connection with a preferred embodiment thereof, it will be understood that various changes in form and detail may be made without departing from the spirit and scope of the invention.

What is claimed is:

1. An apparatus for positioning a web with respect to the print mechanism of a printer, the web defining two parallel continuous marginal edges comprising:

a main support frame carrying an elongated support member in the form of a rod mounted upon the support frame, the axis of the rod being substantially parallel to the plane of the web;

slide means in the form of a tube coaxially positioned over said rod for selective movement therealong;

first means for engaging the web at a fixed location adjacent one of the margins thereof, said first web engaging means being carried upon said slide means for selective movement therealong;

second means for engaging the web at a second fixed location adjacent an alternate margin of the web, said second web engaging means being mounted in a fixed position upon said tube; and first means for releasably securing said first web engaging means to said tube so as to facilitate relative spacing between said first and second web engaging means whereby relative movement of said first and second web engaging means provides selective adaptation of the apparatus to varying web widths and movement of said tube with respect to said rod provides selective orientation of the web with respect to the print station.

2. The apparatus of claim 1 wherein said first securing means includes a first selectively releasable clamp adapted to securely embrace the outer surface of said tube thereby selectively maintaining the position of said first web engaging means with respect to said second web engaging means.

3. The apparatus of claim 2 wherein said first clamp includes a first jaw defining a surface for engaging a portion of the surface of said tube and a second jaw defining a surface for engaging another portion of the surface of said tube and selectively adjustable means for varying the spacing between the surfaces defined by said first and second jaws so as to selectively, frictionally engage said tube thereby facilitating selective positioning of said first clamp along said tube.

4. The apparatus of claim 3 wherein said first clamp includes means for detachably coupling to said first web engaging means thereby securing said first web engaging means in a predetermined position upon said tube as determined by said first clamp.

5. The apparatus of claim 4 which further includes second securing means for selectively maintaining the relative position of said tube on said rod, said second securing means including a second clamp having a first jaw defining a surface for engaging a portion of the surface of said support rod, a second jaw defining a surface for engaging the outwardly disposed surface of said tube and selectively adjustable means for varying the spacing between the surfaces defined by said first and second jaws of said second clamp so as to produce selective, frictional engagement of said tube and said support rod.

6. The apparatus of claim 5 wherein said tube defines an opening for receipt of said first jaw of said second clamp so that the rod engaging surface of said first jaw when positioned within said opening is placed into contact with said rod.

7. The apparatus of claim 1 which further includes second securing means for selectively securing the relative position of said tube on said rod, said second securing means including a clamp having a first jaw defining a surface for engaging a portion of the surface of said support rod, a second jaw defining a surface for engaging the outwardly disposed surface of said slide tube and wherein said slide tube defines a notched opening for receipt of said first jaw of said second clamp so that the rod engaging surface of said first jaw of said second clamp is placed into selective contact with said rod and selectively adjustable means for varying the spacing between the surfaces defined by said first and second jaws of said second clamp producing frictional engagement between said tube and said rod thereby securing the relative position of said slide tube and said support rod.

8. The apparatus of claim 1 wherein at least one of said first and second web engaing means is in the form of a drive tractor adapted for engaging perforations provided adjacent the margin of the web, and means extending from said tractor for detachably engaging one of said clamps so that the position of this clamp determines the location of said associated tractor.

9. The apparatus of claim 8 wherein said first clamp includes a first jaw defining a surface for engaging a portion of the surface of said tubular slide and a second jaw defining a surface for engaging still another portion of the surface of said tubular slide and selectively adjustable means for varying the spacing betwen the surfaces defined by said first and second jaws so as to frictionally engage said tubular slide, said first clamp including means for engaging said detachable engaging means on said first tractor so that said first tractor is positionally located on said tubular slide by said first clamp.

10. The apparatus of claim 9 wherein said second clamp includes a first jaw defining a surface for engaging a portion of the surface of said rod, said tubular member defining an opening for receipt of said first jaw of said second clamp to permit engagement with said rod, said second clamp including a second jaw defining a surface for engaging a portion of said tubular slide and selectively adjustable means for varying the spacing between the surfaces defined by said first and second jaws of said second clamp so as to frictionally engage said rod with said tubular slide, said second clamp including means for engaging said detachable engaging means on said second tractor so that said second tractor is positionally located on said tubular slide by said second clamp.

* * * * *